Figure 1:
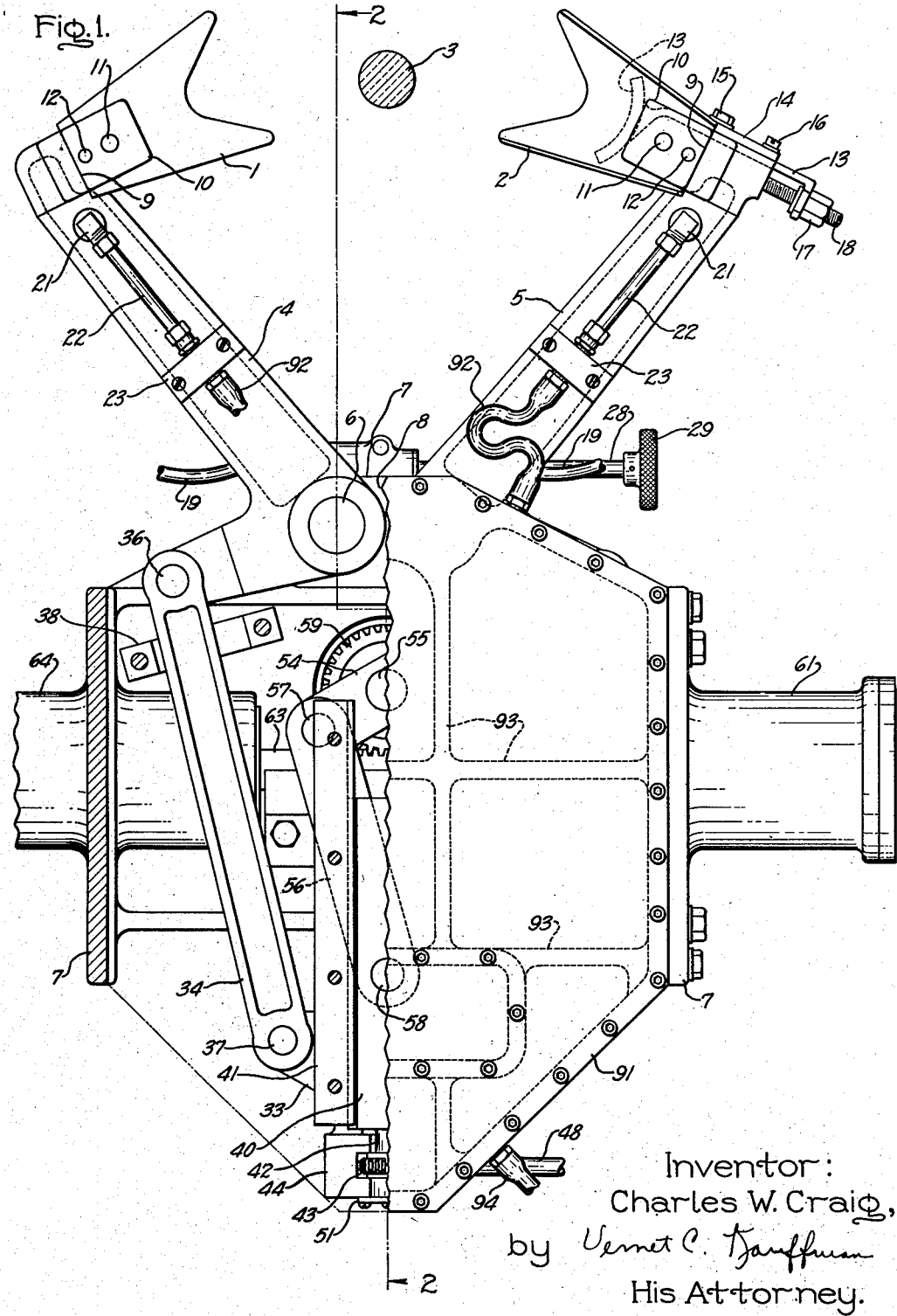

Aug. 15, 1950 C. W. CRAIG 2,518,871
GLASS SEVERING APPARATUS
Filed May 8, 1947 3 Sheets-Sheet 1

Inventor:
Charles W. Craig,
by Vernet C. Kauffman
His Attorney.

Aug. 15, 1950  C. W. CRAIG  2,518,871
GLASS SEVERING APPARATUS
Filed May 8, 1947  3 Sheets-Sheet 2
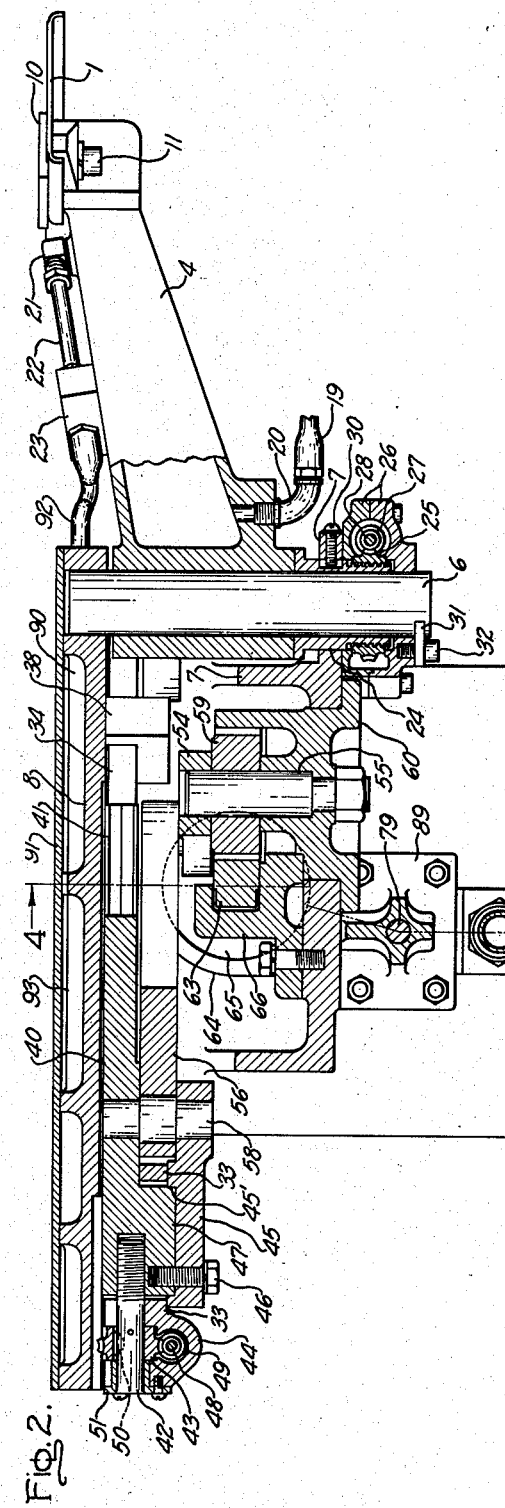
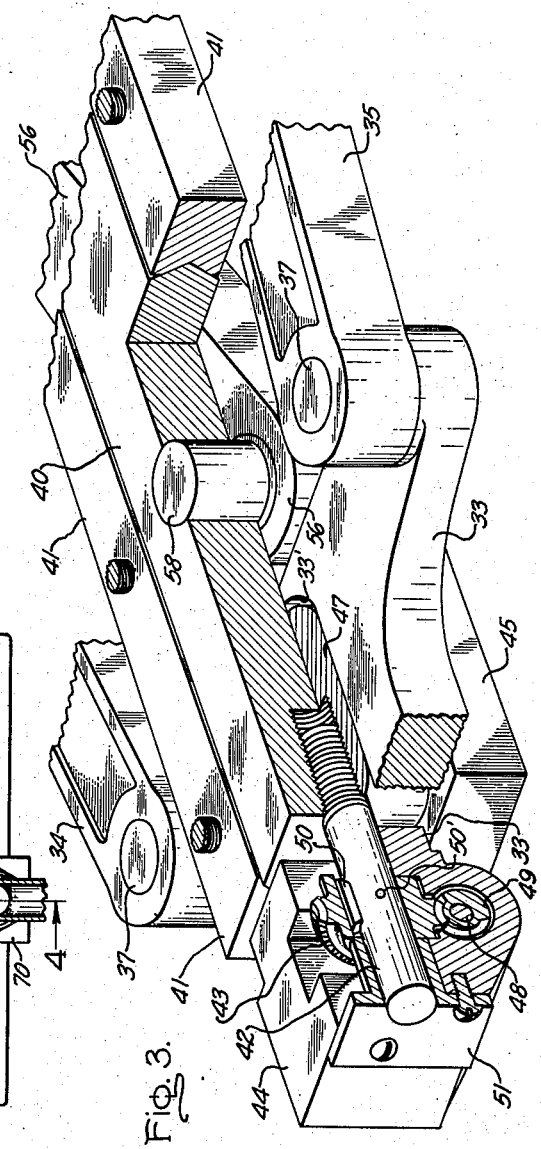
Inventor:
Charles W. Craig,
by Vernet C. Kauffman
His Attorney.

Aug. 15, 1950     C. W. CRAIG     2,518,871
GLASS SEVERING APPARATUS

Filed May 8, 1947     3 Sheets-Sheet 3

Inventor:
Charles W. Craig,
by Vernet C. Kauffman
His Attorney.

Patented Aug. 15, 1950

2,518,871

UNITED STATES PATENT OFFICE 2,518,871

GLASS SEVERING APPARATUS

Charles W. Craig, South Euclid, Ohio, assignor to General Electric Company, a corporation of New York Application May 8, 1947, Serial No. 746,690

8 Claims. (Cl. 49—14)

My invention relates to improved shearing apparatus for severing a stream of molten glass issuing from a furnace orifice into successive gobs or mold charges.

One object of my invention is to provide apparatus for severing a stream of molten glass at very accurately determined intervals and in a satisfactory and exactly duplicated manner. Difficulty has been experienced heretofore in severing the rapidly flowing stream of glass necessary for present day high speed operation in that any differences in the interval or manner of severing result in greatly magnified differences in the mold charges into which the stream is formed. Heretofore many of the differences in successive shearing operations were insignificant and of no consequence since no appreciable differences in the mold charges resulted therefrom; however, the speed of operation and consequently the rate of flow of the glass stream have now increased to a point where said differences result in prohibitive variation in weight, physical shape, chilled condition and proper feeding of the mold charge.

The stream is commonly severed by oppositely disposed shear blades which are brought into contact with the moving stream momentarily and then removed from the path of the stream. The more rapidly the shearing operation is performed the less interference is provided to the movement of the stream and the less drawing out of the cut surface results. Each succeeding cycle of operation of the apparatus must occur at the desired moment and must be completed in exactly the same interval of time to be satisfactory. Many shearing apparatuses are not capable of such rapid and accurate operation and have a secondary cycle of operation wherein every other shearing operation is duplicated but where variations occur between succeeding shearing operations. Still other apparatus is greatly affected by temperature changes, by different stream viscosities, wear and many other conditions.

Another object of my invention is to provide well constructed apparatus for severing a stream of molten glass which apparatus is capable of very accurate manufacture, accurate control and so adequately cooled as to permit satisfactory operation in continuous service for a considerable period of time. The apparatus must be capable of operation for as much of the heat periods of the glass furnace as required to avoid interruptions and consequent unavoidable temperature, etc. changes in the apparatus and melt.

Still other objects and advantages of my invention will appear from the following detailed description of a species thereof and from the drawing.

Figure 4:
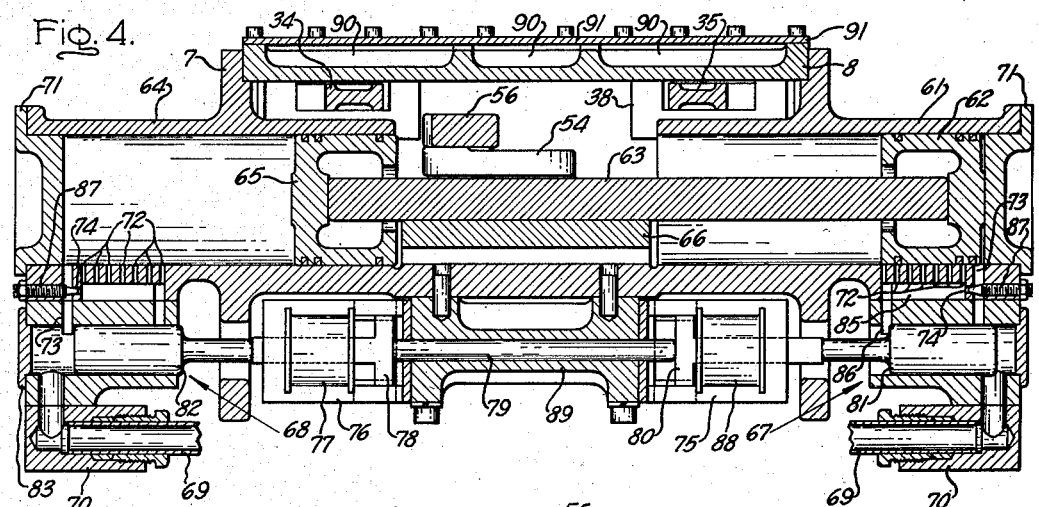
Figure 5:
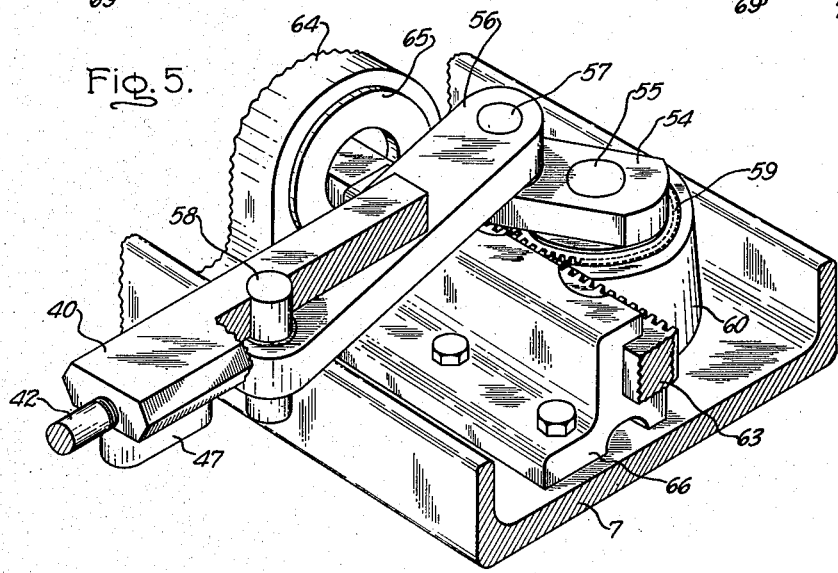

In the drawing, Fig. 1 is a plan view of a species of shearing apparatus comprising my invention from which an end portion and an overlying portion has been broken away; Fig. 2 is a vertical section through the apparatus along line 2—2 of Fig. 1; Fig. 3 is a fragmentary perspective view on a larger scale of the carriage and connected means of the apparatus; Fig. 4 is a section through the apparatus along line 4—4 of Fig. 2; and Fig. 5 is a fragmentary perspective view of the rack, crank means and associated operating mechanism of the apparatus.

The shearing apparatus disclosed in the drawing is mounted below a discharge orifice in the bottom of a glass furnace in a position permitting the cutting blades or shears 1 and 2 of said apparatus to close on and shear the stream 3 of molten glass issuing from said orifice. The cutting blades 1 and 2, as shown in Fig. 1, are located equal distances on opposite sides of the path of movement of the stream 3 during the inoperative period of their cycle of operations and are moved toward each other until said stream 3 is contacted and severed and then out again to the open position in each cycle of operation.

The movement of the cutting blades 1 and 2 results from pivotal movements of the levers 4 and 5 about corresponding stationary pins 6 (only one appearing in the drawing) which are held at their lower ends by a portion of the frame 7 of the apparatus and at their upper ends by a separate plate-like frame member 8. The cutting blades 1 and 2 are mounted against a raised shoulder 9 of each lever 4 and 5, and are clamped thereto in a conventional manner by the plates 10 into which are threaded and fitted the bolts 11 and guide studs 12 respectively.

In the severing movement of the cutting blades 1 and 2, each wipes across the adjacent face of the other to produce a shearing action on the molten stream which action is performed with such rapidity and accuracy that the glass charge or gob developed thereby remains in the form of the stream 3 and free of blemishes along the cut faces. A guide 13 also of conventional construction located below the cutting blade 2 in a customary position prevents the sideward thrust of the opposite and lowermost cutting blade 1 from deflecting the charge from its normal downward path of travel. The guide 13 extends through a slot in the end of the lever 5 in which it is held by the clamping action of the plate 14 located below the heads of bolts 15 and 16 and is capable of accurate adjustment through rotation of the nut 17 which is locked within a slot in a laterally extending heel portion of the guide 13 and which is threaded onto the stud 18 on lever 5.

The satisfactory nature of the shearing operation is maintained in part through the facilities for keeping the cutting blades 1 and 2 in proper alignment at all times. To this end, is provided means for circulating water through the hollow blade-supporting arms of the levers 4 and 5, the water entering each of said arms from an external source (not shown) through flexible hose 19 (Fig. 2) and pipe fitting 20 and leaving through the pipe fitting 21, pipe 22 and block fastening 23. The circulation of water controls the expansion and contraction of the apparatus by maintaining the temperature of said levers 4 and 5 within reasonable limits and materially limiting the amount of heat transferred to pins 6 and the other adjacent parts of the shearing apparatus. Proper alignment of the cutting blades 1 and 2 is also facilitated through the adjustment means for positioning lever 4 vertically on pin 6. Said adjustment means, as shown in Fig. 2, comprises a sleeve 24 about the lower extremity of the pin 6 for supporting said lever 4, an adjustable nut 25 engaging threads on the sleeve 24, and a two-part housing 26 attached to the frame 7 for retaining the nut 25 at a fixed position. Rotation of the nut 25 to provide vertical adjustment of the support sleeve 24 is made through rotation of the worm gear 27 which engages gear teeth in the outer periphery of the nut 25 and which is turned by rotation of the extension shaft 28 and the manually adjusted knob 29 thereon. The end of a screw 30 threaded through a portion of the frame 7 and entering into a vertical groove in the sleeve 24 prevents said sleeve 24 from turning with the nut 25 thereby assuring a corresponding vertical adjustment of the sleeve 24, lever 4 and cutting blade 1 with each manual adjustment of the knob 29. The pin 6 associated with lever 4 is kept from turning and is held in place longitudinally by the key 31 which is fastened to the housing 26 by bolt 32 and which enters a notch in said pin 6, whereas the corresponding pin (not shown) associated with lever 5 is correspondingly held by a fastening directly attached to the frame 7, there being no adjusting means in combination with lever 5.

Other features of the cutting apparatus are provided by the operating means for the levers 4 and 5 which means is particularly suited to duplicate each cycle of operation under every operating condition in both short and long periods of use. The means must also provide exactly duplicate operation of each of the levers 4 and 5 to cause balanced shearing from opposite sides of the stream 3. This manner of operation is assured in part through the connection of each of said levers 4 and 5 to a single cross head 33 (Figs. 1, 2 and 3) by means of corresponding links 34 and 35 respectively and by movement of said cross head 33 forward and then back in an accurately defined path along the projection of a line which is equidistant between the pivot pins 6. The links 34 and 35 are attached to sidewardly projecting arms of the lever 4 or 5 by a pin 36 (only shown in combination with link 34) and to arms of the cross head 33 by a pin 37. The said links 34 and 35 are additionally supported intermediate their ends by the yokes 38 which are attached to the frame member 8 and which provide slide ways for said links. Both the extent and the direction of motion of the cross head 33 are established by the slide 40 which is located directly above said cross head between the guiding gibs 41—41 attached to the frame member 8 and which transfers its motion to the cross head 33 through the stud 42, gear 43 and end portion 44 of said cross head 33. The cross head 33 is supported, but not tightly clamped, between the confines of the slide 40 and the bracket 45 which is attached by bolt 46 (Fig. 2) to a boss 47 of said slide extending through a central opening 33' in the cross head 33 and into a shallow recess 45' in the bracket 45.

The stroke, or back and forth movement, of the slide 40 in each cycle of operation of the apparatus is uniform through all operating conditions thereof; however, it can be altered to effect more or less closing movement of the levers 4 and 5 by screwing the stud 42 in or out of the slide 40. The adjustment is made manually by turning a knob (not shown) on the end of the shaft 48 projecting from the end portion 44 of the cross head 33 so as to turn the worm gear 49 and the gear 43 which is fastened to said stud 42 by a key 50 and the pin 50' to cause the necessary rotation thereof. The gear 43 is held between shoulders in the end portion 44 of the cross head 33 and the bushing 51 which is attached thereto and is not capable of independent movement of either the cross head 33 or stud 42.

The alternate forward and backward movement of the slide 40 which occurs during each cycle of operation is produced therein by the crank motion resulting from a counterclockwise (Fig. 1) pivotal movement of crank 54 about the axis of pin 55 and is transferred thereto through the link 56. The pin 57 joins the crank 54 and one end of the link 56, while the opposite end of said link 56 is joined both to slide 40 and to the bracket 45 by the pin 58. In the succeeding cycle of operation the crank 54 is again swung about the pin 55 but in reverse (clockwise) direction bringing it again to the position in which it is shown in Figs. 1 and 5 of the drawing. Both of the movements of the crank 54 correspond to those of the gear 59 (Figs. 1, 2 and 5) to which said crank 54 is attached, whereby said crank 54 and gear 59 turn about the stationary pin 55 held by the insert portion 60 of the frame 7 of the apparatus.

In the cycle of operation wherein the crank 54 and gear 59 are turned clockwise (Fig. 1), the operation of the apparatus results from admission of compressed air into the cylinder 61 and the consequent movement of the piston 62 (Fig. 4) and the longitudinal movement of the rod or rack 63 engaged thereby, the teeth of which engage those of gear 59. In the succeeding cycle of operation, it is the admission of compressed air into the opposite cylinder 64 and consequent movement of piston 65 and the reverse motion of the rod or rack 63 against which it bears that actuates the apparatus. The rod or rack 63 is independent of all support except the bracket 66 (Figs. 2, 4 and 5) which provides slide ways therefore in alignment with the cylinders 61 and 64 and which is mounted directly on the frame 7. The pistons 62 and 65 merely butt against the ends of the rod or rack 63 and cannot cause binding of the teeth thereof and of gear 59 should unequal expansion of the frame 7, of which the cylinders 61 and 64 are a part, disalign the apparatus or should some other abnormal operating condition be encountered that could interfere with the operation thereof and change the period of operation of the apparatus.

The admission of compressed air into the cylinder 61 or 64, the single act required to operate the entire apparatus, is under the control of the valves 67 and 68 respectively which are directly associated therewith. The compressed air is taken from a common source (not shown) which is connected to the valves 67 and 68 by the pipes 69, 69 and the pipe connections 70, 70 and is admitted into one of the cylinders 61 (or 64) through valve 67 (or 68) and exhausted from the other cylinder through the other valve 68 (or 67) at all operation periods of the apparatus. The limit of operation is reached when the piston 62 (or 65) opposite that under the influence of compressed air engages the head 71 of the cylinder 61 (or 64) during the forced movement thereof in which air exhausts from the cylinder 61 (or 64) through the spaced inlet and exhaust ports or passages 72 and 73 therein, the bleeder valve 74 and the valve 67 (or 68) associated therewith.

Each cycle of operation of the apparatus, as determined by the resetting of the valves 67 and 68, is brought about by suitable timed control means which is caused to actuate the valves 67 and 68 through the making and breaking of electrical circuits connected to the solenoids 75 and 76 associated with said valves 67 and 68. The timing means can be of any of several commercial forms, one of which has an electric motor rotating cams which operate the switching means and another of which has electronic means for controlling the switching. The apparatus, as it is shown in the drawing, has completed a cycle of operation which was initiated by an operation of the timing means which provides for the connection of the coil 77 of the solenoid 76 to a source of electricity whereby the armature 78 thereof is caused to move to the position shown (Fig. 4), pushing the rod 79, the armature 80 of the solenoid 75 and the valving pin 81 of the valve 67 correspondingly. The pressure of the compressed air entering the valve 68 from the associated pipe fitting 70 and bearing against the head end of the valving pin 82 located behind the cap 83 thereof shifts the valving pin 82 longitudinally in keeping with the movement of the armature 78 of the solenoid 76 against which it butts. At these positions of the valving pins 81 and 82, compressed air flows freely from the chamber of valve 68 to the cylinder 64 through the connecting passage 73 at the extreme head end thereof and the compressed air trapped behind piston 62 in cylinder 61 is allowed to escape to the atmosphere through the associated passages 72 in the cylinder wall and the connected passage 85 and exhaust passage 86 which terminates beyond the head of valving pin 81. Additional escape means is provided for the air in cylinder 61 by the associated passage 73 and branch passage 74 which is connected to passage 85 and which is restricted by the end of adjusting screw 87. The escape openings 72 and 73 for the air are spaced from the head end of the cylinder 61 amounts which allow the piston 62 to gradually move over one end thereof and block off said openings 72 thereby effecting a cushioned stop at the end of the motion. The cushioning effect occurs after the apparatus moves sufficiently to completely shear the molten stream and the cutting blades 1 and 2 are being returned to the rest position and, therefore, does not retard the shearing operation which takes place at the height of movement of the pistons 62 and 65. It is not possible to adjust the cycle of operation of the apparatus and change the delicate balance of succeeding cycles thereof as the adjusting screw 87 associated with cylinder 61 and the corresponding screw 87 associated with the cylinder 64 are capable of effecting, to any extent, only the very final movements of the pistons 62 and 65. In the manufacture of the shearing apparatus, perfect balance is assured in certain instances by disassembling it after test and altering the size of the passages 72 as required. The function of the adjusting screw 87 is to control the final cushioning of the operation cycle so that different air pressures cannot cause an abrupt stop to said operation. The presently described cycle of operation is completed by the breaking of the circuit to the solenoid 76 which operation does not disturb the relation of the parts of the apparatus.

The subsequent cycle of operation is brought about at the properly timed interval thereafter by the connection of the coil 88 of solenoid 75 to the source of electricity by the timing control apparatus. This results in the movement of the armature 80 of the solenoid 75, causing the rod 79, armature 78 and valving pin 82 to be shifted longitudinally and allowing valving pin 81 to shift whereby compressed air is admitted into cylinder 61 and air is exhausted from cylinder 64. Both solenoids 75 and 76 are mounted on the bracket 89 which supports rod 79 and which is fastened to the frame 7 of the apparatus.

Each cycle of operation of the apparatus occurs in exactly the same time interval due to exact duplication of apparatus associated with each cylinder. Futher assurance of constant uniform operation of the apparatus is brought about by the shielding and cooling effect of water circulated through the passages 90 formed between the frame member 8 and the cover plate 91 attached thereto. The water is introduced into the passages 90 in the frame member 8 by the discharge hoses 92 attached to the levers 4 and 5 and circulates over the ribs 93 of the frame member 8 to corresponding outlet fittings and hoses 94 (only one being shown) at the opposite side thereof. The apparatus is particularly suited to avoid all misalignment of parts because of uneven heating and expansion of the parts thereof and to provide a positive and strong shearing operation which provides for the quick withdrawal of the shearing blades after their shearing function is completed.

What I claim as new and desire to secure by Letters Patent of the United States is:

1. Glass severing mechanism comprising shears, a longitudinally movable rod member, means defining slide ways to support said rod member and confine its movement to a longitudinal direction, means operatively connecting said member to said shears to close and open said shears during its continued rectilinear movement in one direction, and means for operating said member comprising opposed cylinders located at opposite ends of said member, a piston in each of said cylinders and engageable with the adjacent end of said member solely by abutting contact, and valve means associated with each cylinder for alternately admitting a fluid into one of said cylinders and allowing exhaust of fluid from the other cylinder.

2. Glass severing mechanism comprising shears, a longitudinally movable rack member, means defining ways to support said rack member and confine its movement to a longitudinal direction, means operatively connecting said member to said shears to close and open said shears during its continued rectilinear movement in one direction, including a gear engaging the teeth on said rack member, and means for operating said member comprising opposed cylinders located at opposite ends of said member, a piston in each of said cylinders and engageable with the adjacent end of said member solely by abutting contact, and valve means associated with each cylinder for alternately admitting a fluid into one of said cylinders and allowing exhaust of fluid from the other cylinder.

3. Glass severing mechanism comprising shears, a longitudinally movable member, means operatively connecting said member to said shears to close and open said shears during its continued rectilinear movement in one direction, and means for operating said member comprising opposed cylinders located at opposite ends of said member, a piston in each of said cylinders and engageable with the adjacent end of said member solely by abutting contact, opposed valve means including a valve pin carried by each cylinder for alternately admitting a fluid into one of said cylinders and allowing exhaust of fluid from the other cylinder, and operating means for the valves including a member reciprocable in a rectilinear path and located between and engageable with said valve pins solely by abutting contact.

4. Glass severing mechanism comprising shears, a longitudinally movable member, means operatively connecting said member to said shears to close and open said shears during its continued rectilinear movement in one direction, and means for operating said member comprising opposed cylinders located at opposite ends of said member, a piston in each of said cylinders and engageable with the adjacent end of said member solely by abutting contact, and valve means associated with each cylinder for alternately admitting a fluid into one of said cylinders and allowing exhaust of fluid from the other cylinder, and means associated with said valve means for restricting the exhaust of fluid from said cylinders just before the said pistons reach the limits of their exhaust strokes whereby to cushion the operation of the said pistons.

5. Glass severing mechanism comprising shears, a longitudinally movable member, means operatively connecting said member to said shears to close and open said shears during its continued rectilinear movement in one direction, and means for operating said member comprising opposed cylinders located at opposite ends of said member, a piston in each of said cylinders and engageable with the adjacent end of said member solely by abutting contact, and valve means associated with each cylinder for alternately admitting a fluid into one of said cylinders and allowing exhaust of fluid from the other cylinder, and means associated with said valve means for restricting the exhaust of fluid from said cylinders just before the said pistons reach the limits of their exhaust strokes whereby to cushion the operation of the said pistons, said last-mentioned means including manually adjustable bleeder valve members.

6. Glass severing mechanism comprising shears, a longitudinally movable member, means operatively connecting said member to said shears to close and open said shears during its continued rectilinear movement in one direction, and means for operating said member comprising opposed cylinders located at opposite ends of said member, and each having a series of inlet and exhaust ports in the side walls thereof at and various distances from the head end thereof, a piston in each of said cylinders in operative engagement with the adjacent end of said member and movable successively across the said series of ports, and valve means associated with each cylinder and including a valve pin and passages including an inlet passage communicating with the said port at the head end of the cylinder and an exhaust passage communicating with the remaining ports, said valve pin closing said port at the head end of the cylinder from said inlet passage and leaving said exhaust passage open to the atmosphere during the exhaust cycle of the associated cylinder, means to supply fluid under pressure continually to the inlet passages of the valve means associated with both said cylinders, and means affording restricted communication between the said port at the head end of the cylinder and the said exhaust passage whereby to cushion the operation of the piston on its exhaust stroke.

7. Glass severing mechanism comprising shears, a longitudinally movable member, means operatively connecting said member to said shears to close and open said shears during its continued rectilinear movement in one direction, and means for operating said member comprising opposed cylinders located at opposite ends of said member, and each having a series of inlet and exhaust ports in the side walls thereof at and various distances from the head end thereof, a piston in each of said cylinders in operative engagement with the adjacent end of said member and movable successively across the said series of ports, and valve means associated with each cylinder and including a valve pin and passages including an inlet passage communicating with the said port at the head end of the cylinder and an exhaust passage communicating with the remaining ports, said valve pin closing said port at the head end of the cylinder from said inlet passage and leaving said exhaust passage open to the atmosphere during the exhaust cycle of the associated cylinder, means to supply fluid under pressure continually to the inlet passages of the valve means associated with both said cylinders, and means comprising a manually adjustable bleeder valve member affording restricted communication between the said port at the head end of the cylinder and the said exhaust passage whereby to cushion the operation of the piston on its exhaust stroke.

8. Glass severing mechanism comprising a support frame, a pair of shears carried by lever arms pivotally mounted at one end of said frame, a cross head, link means connecting each of said lever arms to said cross head, means mounting said cross head on said frame for rectilinear movement along the projection of a line which lies midway between the pivot axes of said lever arms and normal to the line joining said pivot axes, a pair of opposed and aligned cylinders integral with said frame and located at opposite sides thereof on an axis substantially normal to the path of movement of said cross head, a piston in each of said cylinders, a rack extending longitudinally between said pistons and engageable therewith solely by abutting contact, means mounting said rack on said frame for rectilinear movement by said pistons, a gear mounted on said frame in meshing engagement with said rack, a crank arm attached to said gear, and means operatively interconnecting said crank arm with said cross head to effect reciprocation of said cross head.

CHARLES W. CRAIG.

REFERENCES CITED

The following references are of record in the file of this patent:

UNITED STATES PATENTS

| Number | Name | Date |
| --- | --- | --- |
| 1,806,743 | Cramer | May 26, 1931 |
| 2,218,970 | Honiss | Oct. 22, 1940 |